…

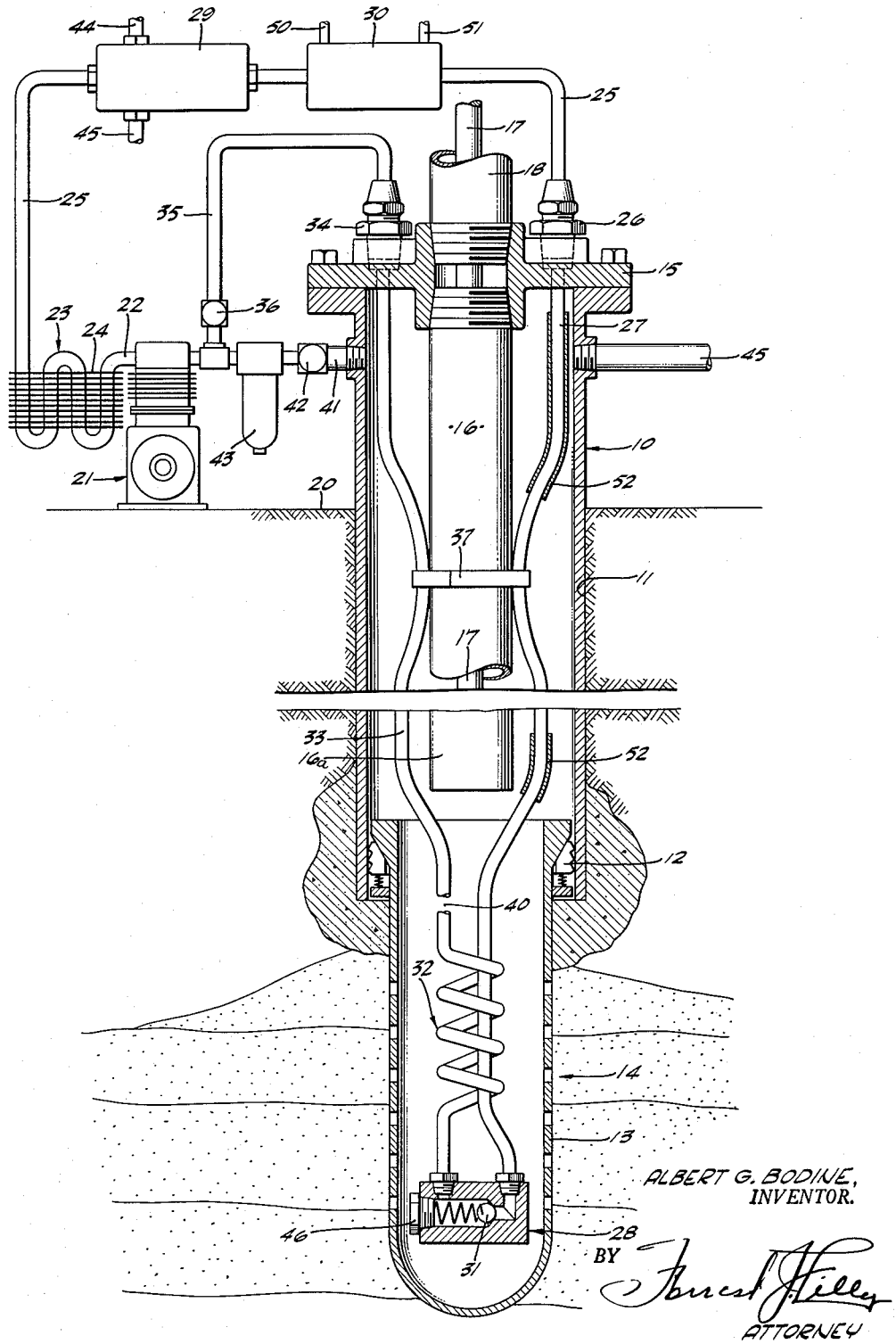

United States Patent Office 3,004,601  
Patented Oct. 17, 1961

3,004,601  
METHOD AND APPARATUS FOR AUGMENTING OIL RECOVERY FROM WELLS BY REFRIGERATION  
Albert G. Bodine, 13120 Moorpark St., Sherman Oaks, Calif.  
Continuation of application Ser. No. 368,796, July 17, 1953. This application May 9, 1958, Ser. No. 734,294  
1 Claim. (Cl. 166—39)

This invention relates generally to so-called secondary recovery in oil well production practice, and deals with a novel process and apparatus for augmenting oil recovery by refrigeration of the producing formation about the well.

This application is a continuation of my application Serial No. 368,796, filed July 17, 1953, for Method and Apparatus for Augmenting Oil Recovery from Wells by Refrigeration now abandoned.

I have observed that petroleum laden earthen structure becomes "vapor locked" by released gas under conditions of decreasing pressure or increasing temperature. This tends to seriously reduce the permeability of the structure to oil flow. It is my hypothesis that under such conditions the flow of the hydrocarbon liquid is impeded by the presence of tiny gas bubbles in the interstices of the formation. I have further observed that by cooling the structure under such conditions, the oil flow materially increases, indicating that the gas has gone back into solution in the oil.

Thus gradually diminishing production in certain oil wells may be attributed, at least in part, to gas bubbles released in the interstices of the formation about the well by release of pressure on the oil as the field becomes depleted. This condition is further aggravated, I believe, by gravity drainage conditions in which the oil "runs downhill" to warmer conditions. Wells to which the present invention is particularly applicable are thus pressure depleted wells and gravity drive wells.

The primary object of the invention is to augment recovery from such gas-locked wells by causing the gas to go back into solution in the oil.

The process of the invention comprises, broadly speaking, extracting sufficient heat from the gas-locked productive formation about the well to reduce its temperature to a level below the absorption or equilibrium temperature of the mixture of hydrocarbon gases present under the prevailing condition of pressure. It will be understood that the gas mixture present will comprise a number of gas components, each with an individual equilibrium temperature; but that there is an equilibrium temperature for the mixture as a whole, and it is to this latter that reference is made.

There has previously been proposed a system for condensing hydrocarbon gases that have entered the well bore by direct cooling thereof within the well bore. However, this system necessarily reduces the temperature of the gas mixture present only down to the equilibrium or condensation temperature thereof, but cannot lower the temperature below that level, such as is necessitated by the practice of the present invention, in order that the surrounding formations be cooled to a sub-equilibrium temperature for the gas mixture locked therein. The present invention is thus distinguished by cooling of the formation to a temperature below the equilibrium condensation temperature for the gas mixture in the formation. In particular, it is to be noted that the cooling of the formation is carried down to a level not merely sufficient to condense lighter ends in the mixture, but below the equilibrium condensation temperature for the mixture as a whole, whereby the heavy as well as light ends are condensed. Moreover, because of the laws of heat flow, there is necessarily a temperature gradient, so that if the cooling source is in the well, it will have to be substantially cooler in order to accomplish sufficiently low temperature for an appreciable distance back in the formation.

The process of the invention may be practiced in various ways and with various forms of apparatus in accordance with the invention, several illustrative examples of which will be given in the following detailed description wherein reference is had to the accompanying drawing.

In the drawing, numeral 10 designates generally a well casing extending downwardly in bore hole 11, and from the lower end of which is hung, by means of conventional liner hanger 12, the usual perforated liner 13 surrounded by productive formation 14. On the upper end of casing 10 is mounted casing head 15, and screwed into and suspended from this head 15 production tubing 16, understood to carry, at its lower end, a conventional deep well pump 16a, or, in the case of flowing wells, to have an open lower end. In the case of a conventional reciprocating pump, a sucker rod string 17 extends through the tubing 16 and is reciprocated by any conventional mechanism, not shown. The oil produced from the refrigerated formation passes through head 15 to a tubing 18 leading to the conventional fixture above, not shown.

At the ground surface, designated at 20, is a pump or compressor 21 such as used in mechanical refrigeration systems, and this unit has discharge line 22 leading to heat radiator or exchanger generally designated at 23, and here indicated as of the type having heat radiating fins 24. To the outlet side of this heat exchanger 23 is connected line 25, which is coupled at the casinghead, as indicated at 26, to a line 27 extending downwardly within the casing 10 and liner 13 to an expansion valve unit 28 in the lower portion of the liner. The refrigerant line 25 has been shown to include a separator 29 and a second heat exchanger 30, but it is to be understood that these are optional or employed only in certain variant practices of the invention, and may be disregarded for the time being, the assumption being first made that line 25 connects the heat exchanger 23 directly to the coupling 26 leading to the tubing 27.

The expansion valve unit 28 referred to above, and conventionally illustrated in the drawings, is shown to have a spring pressed valve element 31, and the coolant or refrigerant gases discharged past the valve element 31 are expanded and reduced in pressure, and hence dropped to a low temperature. These low temperature gases then flow from valve unit 28 through refrigeration coils 32 arranged along the length of the liner. The return from the coils 32 may be via tubing 33 extending back up through casing 10 and coupled at the casinghead, as at 34, to line 35 leading through control valve 36 to the intake side of compressor 21. Both the refrigerant supply and return liner may be supported by the production tubing 16 by use of clips such as indicated at 37.

In the system as thus described, it will be seen that I have incorporated a conventional mechanical refrigeration system in a conventional oil well with a separate refrigerant fluid flowing through the cooling coils arranged within the liner, where they act to refrigerate the surrounding well fluids and productive formation about the liner. The refrigeration effect of course extends outwardly into the formation to a variable extent depending upon the power of the refrigeration unit and the thermal conductivity of the oil bearing formation. In general, it is desirable to refrigerate the formation sufficiently outward from the liner to reduce the temperature of that extent of the formation which has become vapor-locked to a point below the absorption or equilibrium temperature of the mixture of hydrocarbon gases present in the formation and available for flow into the well bore. It will of course be understood in this connection that, whereas a large fraction of the gas mixture present is locked in the formation, a fraction of the mixture of gases present in the formation normally flows into the well bore. The system is thus designed to extract sufficient heat from the surrounding productive formation to reduce the temperature of its vapor-locked area to a level low enough to cause condensation of the mixture of gases present in the formation, inclusive of the heavy ends. The invention is best practiced by lowering the temperature in the surrounding productive formation in any given well to the point at which material increase and recovery rate is noted, and beyond which further material increase and recovery rate is not detectible. It will be seen that the heat thus extracted from the formation may be conducted up the return tubing 33, to be dissipated from the system, for example at heat exchanger 23. It may also be dissipated by use of an additional heat exchanger, not shown, used ahead of the pump 21. If the compressor is located in the well the heat may be dissipated into the up-flowing oil production.

It is also possible in accordance with the invention to utilize the hydrocarbon gases of the well as the coolant or refrigerant medium, and for such purpose, the refrigerant return line 33 can be removed, as indicated by the break at 40 just above the refrigerant coils 32. Also, the refrigerant line 35 may be removed, or valve 36 closed. Gases from the upper end of the casing are led via line 41, a shut-off valve 42, and filter 43 to the intake of compressor 21. In the event that the well gases contain either overly light or overly heavy fractions for use in the refrigeration system, they can be removed by separator 29, of any conventional type, having discharge lines 44 and 45 for the unduly light and/or unduly heavy fractions, respectively. In this case, the refrigeration system is, in general, the same as before the compressed refrigerant gas being expanded and cooled within valve 28, and then passed through coils 32 to refrigerate the surrounding well fluids and productive formation. The gas in this case is discharged from the open upper end of the refrigerating coils 32. It is also feasible to discharge the gas at a point higher up in the casing, at the upper end thereof and this may be desirable in any well in which the discharged gas tends to cause de-waxing or a residue settlement problem. The refrigeration system in this form constantly takes in gas from the upper end of the casing via the line 41 and filter 43 to the compressor. Unused gas from the well is delivered via a line 45 connected into the upper end of the casing, as usual. It is also possible to operate without the coils 32, the refrigerated gases being allowed to bubble upwardly through the well fluid after release directly from the expansion valve 28. In such case, the coils 32 are omitted, and the valve 28 opened to the interior of the liner as by removal of plug 46.

In still another practice of the invention, refrigerated coolant liquid is circulated down into the well through the line 27, and returned from the cooling coils 32 via the line 33. In this case, the unit 21 acts as a liquid pump. The liquid which it discharges via the line 22 is cooled at the ground surface, for example, by blowing cooled air from a cooling tower across the fins 24 of the heat exchanger 23. Alternatively to use of the heat exchanger 23, or in addition thereto, the liquid discharged by the pump 21 can be passed through a heat exchanger 30 of a type including cooling coils connected to a mechanical refrigerator. Thus, the heat exchanger 30 may comprise a vessel through which the liquid in the line 25 is circulated, and suitable cooling coils (not shown) immersed in such liquid and connected via lines 50 and 51 to a mechanical refrigeration system. In this practice of the invention, it is necessary to equip the down-flowing line 27 with a suitable heat insulation jacket such as indicated at 52. Also, the valve element 31 is omitted.

With the last described variant of the process, the cooled liquid comes into heat exchange relationship with the well fluids in flowing through the coils 32, extracting heat therefrom, which in turn extracts heat from the surrounding formation, so as to refrigerate the formation in the way and with the same results as previously described.

The cooling effect required to accomplish my invention is much greater than any possible cooling effect resulting from the practice of various known systems where fluids are conducted through wells for various purposes. For example, in the last above-described form, the insulation 52, or the equivalent, is necessary to assure supply of sufficiently low temperature coolant to the bottom of the well.

The examples of apparatus for practice of the invention as given above will be understood to be for illustrative purposes only, and it will be understood that various changes in design, structure and arrangement may be made without departing from the spirit and scope of the appended claim.

I claim:

The secondary recovery process of increasing the recovery of hydrocarbon liquid from a petroleum-bearing formation having a well bore therein, which formation contains a mixture of hydrocarbon gases locked in the formation and a hydrocarbon liquid whose flow to the well bore is impeded by said locked gases, that comprises: providing a coolant means in the well bore adjacent the formation; operating said coolant means in a manner to cool the well bore and the formation adjacent to and for a substantial distance back from the well bore to a temperature which is below the equilibrium temperature which would be required to condense the mixture of hydrocarbon gases normally available in the formation for flow into the well bore, so that said mixture of hydrocarbon gases in the formation is cooled to a value at which condensation thereof takes place within the formation, and said condensed gases are absorbed by the hydrocarbon liquid in the formation; and producing from the formation hydrocarbon liquid containing the condensate from said hydrocarbon gas mixture.

References Cited in the file of this patent

UNITED STATES PATENTS

| | | |
|---|---|---|
| 1,812,267 | Lewis | June 30, 1931 |
| 2,033,561 | Wells | Mar. 10, 1936 |